United States Patent
Klein et al.

(10) Patent No.: US 11,783,093 B2
(45) Date of Patent: Oct. 10, 2023

(54) SINGLE-CHIP SYSTEM, METHOD FOR OPERATING A SINGLE-CHIP SYSTEM, AND MOTOR VEHICLE

(71) Applicant: Audi AG, Ingolstadt (DE)

(72) Inventors: Markus Klein, Pförring (DE); Kamil Zawadzki, Munich (DE); Changsup Ahn, Ingolstadt (DE); Hans Georg Gruber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 576 days.

(21) Appl. No.: 16/652,553

(22) PCT Filed: Oct. 16, 2018

(86) PCT No.: PCT/EP2018/078215
§ 371 (c)(1),
(2) Date: Mar. 31, 2020

(87) PCT Pub. No.: WO2019/081270
PCT Pub. Date: May 2, 2019

(65) Prior Publication Data
US 2020/0242276 A1 Jul. 30, 2020

(30) Foreign Application Priority Data
Oct. 26, 2017 (DE) ............ 10 2017 219 242.9

(51) Int. Cl.
*G06F 21/76* (2013.01)
*G06F 21/55* (2013.01)

(52) U.S. Cl.
CPC ............ *G06F 21/76* (2013.01); *G06F 21/554* (2013.01); *G06F 2221/034* (2013.01)

(58) Field of Classification Search
CPC ... G06F 21/76; G06F 21/554; G06F 2221/034
(Continued)

(56) References Cited

U.S. PATENT DOCUMENTS

| 9,887,844 B2 | 2/2018 | Gehrer et al. |
| 2009/0077417 A1* | 3/2009 | Hildebrand ........... G06F 21/554 714/15 |

(Continued)

FOREIGN PATENT DOCUMENTS

| CN | 102724176 A | 10/2012 |
| CN | 106254318 A | 12/2016 |

(Continued)

OTHER PUBLICATIONS

International Preliminary Report on Patentability directed to related International Patent Application No. PCT/EP2018/078215, completed Jan. 24, 2020, with attached English-language translation; 11 pages.

(Continued)

*Primary Examiner* — Dereena T Cattungal
(74) *Attorney, Agent, or Firm* — Sterne, Kessler, Goldstein & Fox P.L.L.C.

(57) ABSTRACT

Single-chip system, having multiple computing units, in particular computer cores and/or CPUs, at least one input/output unit, a memory unit, and an input/output control unit that coordinates the communication between the computing units and the at least one input/output unit, wherein the single-chip system further has an attack detection unit, produced as hardware, that is connected by means of a hardware signal connection to at least the input/output control unit as a component of the single-chip system and evaluates input signals received from the input/output control unit for a rule infringement in a set of attack detection rules, which rule infringement needs to be logged and/or responded to with at least one measure.

16 Claims, 2 Drawing Sheets

(58) Field of Classification Search
USPC .......................................................... 726/1
See application file for complete search history.

(56) References Cited

U.S. PATENT DOCUMENTS

| | | | |
|---|---|---|---|
| 2009/0113141 A1 | 4/2009 | Bullman et al. | |
| 2009/0210644 A1 | 8/2009 | Batifoulier et al. | |
| 2011/0119445 A1* | 5/2011 | Gooding | G06F 15/17381 |
| | | | 711/E12.024 |
| 2016/0026824 A1* | 1/2016 | Hars | G06F 21/78 |
| | | | 726/26 |
| 2016/0301671 A1 | 10/2016 | Dahlstrom et al. | |
| 2017/0076116 A1* | 3/2017 | Chen | G06F 21/554 |
| 2017/0093910 A1* | 3/2017 | Gukal | H04L 63/1416 |
| 2017/0185345 A1 | 6/2017 | Lim et al. | |
| 2018/0217942 A1* | 8/2018 | Fons | G06F 12/1408 |

FOREIGN PATENT DOCUMENTS

| | | | |
|---|---|---|---|
| CN | 106548099 A | 3/2017 | |
| DE | 102013227184 A1 | 7/2015 | |
| DE | 102016123744 A1 | 6/2017 | |
| DE | 102017124399 A1 | 8/2018 | |
| EP | 1811415 A1 | 7/2007 | |
| EP | 2472408 A1 | 7/2012 | |
| WO | WO-2010117155 A2 * | 10/2010 | ........... G06F 21/564 |
| WO | WO 2010117155 A2 | 10/2010 | |

OTHER PUBLICATIONS

International Search Report and Written Opinion of the International Searching Authority directed to related International Patent Application No. PCT/EP2018/078215, dated Dec. 7, 2018, with attached English-language translation; 15 pages.

* cited by examiner

SINGLE-CHIP SYSTEM, METHOD FOR OPERATING A SINGLE-CHIP SYSTEM, AND MOTOR VEHICLE

TECHNICAL FIELD

The present disclosure relates to a single-chip system, having multiple computing units, in particular, computer cores and/or CPUs, at least one input/output unit, a memory unit, and an input/output control unit that coordinates the communication between the computing units and the at least one input/output unit. In addition, the present disclosure relates to a method for operating such a single-chip system, and a motor vehicle.

BACKGROUND

Single-chip systems, frequently also known as "system on a chip" or SoC, have already been proposed in the prior art. In general, a plurality of computing units, in particular computer cores, which can be operated simultaneously, are realized by such single-chip systems, wherein further components of the single-chip system provide memory space and input/output options (I/O) or realize data exchange between the aforementioned components. An example of such a component of the single-chip system, which coordinates data exchange between components of the single-chip system, is an input/output control unit that coordinates the communication between the computing units and the at least one input/output unit. Ultimately, such an input/output control unit coordinates the inward and outward data flow via different connections of the single-chip system at the computing unit level or also at the level of virtual computing components. For example, computing power or computing power portions of different computing units can be combined. For such input/output control units, different terms are known in the prior art, for example, SMMU (system memory management unit) from Samsung.

Due to the flexibility, computation rate, and low installation space requirements of such single-chip systems, their area of application is constantly increasing. For example, it is conceivable to provide different operating systems on a single-chip system, which allow for the parallel execution of different applications; it is further conceivable to map different security levels/security requirements using different operating systems or computing units or computing components, so that, for example, a wide variety of functions can be implemented by such a single-chip system. Accordingly, the use of single-chip systems in control units of motor vehicles has already been proposed, where, for example, the concept of a so-called "central advanced driver assistance system" can be implemented using at least one such single-chip system, on which both less safety-critical functions, for example, multimedia functions, and functions more critical to safety, for example, functions relating to vehicle guidance, can be executed. Security requirements are specified for a variety of these functions, which are defined by the ISO 26262 standard. Correspondingly safety-critical functions, to which a security requirement, for example, an ASIL, is assigned, must be executed by components certified with regard to the standard, which naturally also applies to subcomponents of the single-chip system.

So-called "intrusion detection systems" (IDS) have already been proposed in software-based systems. An IDS is used to identify compromised systems and to provide the option of responding to a compromised system that has been attacked (IPS or intrusion prevention system). An IDS adds more software to an overall system and thus provides additional attack paths that must also be taken into consideration with regard to security when risk analysis is performed. In addition, such IDSs entail loss of performance because computing power is required for the corresponding software means realizing the IDS.

In modern single-chip systems with a plurality of computing units, especially when combining different security requirements, security measures are frequently implemented by a strong separation between subsystems of different security requirements. Such a separation can be provided by the introduction of hardware-based mechanisms, for example, guard pages in memory units. Another example is a hardware-based separation of access to memory areas ("memory access control").

With regard to single-chip systems, IDS are usually not used because no additional attack paths are supposed to be opened by additional software, and loss of performance is supposed to be prevented as much as possible. In addition, interaction with already existing security mechanisms is supposed to be prevented as much as possible.

US 2009/0113141 A1 relates to a memory protection system and an associated method. In this case, a memory access control unit for shared memory is provided, wherein a permission table that defines read and write permissions for the majority of computing units is also provided. A memory fault detector, which has an input for receiving memory access queries, is coupled, wherein a logic determines whether the memory access thus described would conflict with the permission table.

DETAILED DESCRIPTION

The problem addressed by the present disclosure is that of providing a realization of an "intrusion detection system" (IDS) for a single-chip system, which allows for extensive detection options at the most secure implementation possible, which also influences the performance of the single-chip system as little as possible.

In some embodiments, the above-mentioned problem is solved, according to the present disclosure, in that it is provided in a single-chip system of the initially described type that the single-chip system further has an attack detection unit, produced as hardware. The attack detection unit is connected by means of a hardware signal connection to at least the input/output control unit as a component of the single-chip system. It evaluates input signals received from the input/output control unit for a rule infringement in a set of attack detection rules, which rule infringement needs to be logged and/or responded to with at least one measure.

In some embodiments, the attack detection unit thus forms part of an IDS or even an IDPS (intrusion detection and prevention system). Signals from a plurality of components of the single-chip system, comprising at least the input/output control unit, are used and evaluated for a possible attack, independently of the remaining operation of the single-chip system, which makes it possible to give an attacker the illusion that the activity of the attacker has not yet been detected. Additional hardware is therefore added within the single-chip system, which comprises at least hardware signal connections from different hardware-based components of the single-chip system to a separated IDS. The use of such a separated IDS prevents the use of pure, vulnerable software, and, therefore, does not add any new points of attack because the IDS works via the additional, otherwise unused hardware signal connections and ideally does not interact with the other computing units in a receiving or attackable manner. As a result, there is also minimal influence on existing security mechanisms, and it is ensured that the IDS itself is provided in a secure area of the single-chip system. The detection of an attack or corruption of the single-chip system cannot be hidden behind an infected part of the single-chip system, particularly a part already taken over; the use of separate additional hardware also makes it possible to implement IDS without sacrificing the computing power of the computing units.

In some embodiments, the set of attack detection rules can but does not necessarily have to be realized as part of the attack detection unit. It is also conceivable to provide the set of attack detection rules elsewhere, i.e., decentrally, as hardware, for example, on the components which supply input data to the attack detection unit. A decentralized design of the set of attack detection rules can further reduce the computing power that must be provided for the attack detection unit.

In some embodiments, the attack detection unit is realized as a separate hardware component of the single-chip system, for example, as an ASIC and/or a separate additional computing unit (CPU/computer core). The attack detection unit thus represents a hardware component invisible to the computing units, which can carry out the monitoring for attacks in the background, unaffected by other processes within the single-chip system, in accordance with the set of attack detection rules. Accordingly, neither additional points of attack are realized, nor is it transparent to an attacker, whether or not the attack has already been detected. Furthermore, there is no loss in terms of the computing power of the single-chip system because no influence is exerted on the computing units defining said computing power unless a measure is required, as will be described in more detail below. For that purpose, the hardware signal connection is designed as a signal line for the signals to be transmitted. By way of a non-limiting example, the signal line can only be used in one direction.

In some embodiments, a similarly secure, preferred variation is provided if the attack detection unit is realized as part of an inspection unit provided for monitoring a component, in particular, a computing unit and/or a virtual computing component, of the single-chip system, and realized as an additional computing unit, particularly analyzing a shadow memory. In other words, if additional hardware is already present, which is "invisible" to the computing units and extremely powerful and thus usually realized as an additional computing unit, and which monitors a virtual computing component using one computing unit and/or computing power of a plurality of computing units and which can be understood as an inspection unit or part of an inspection system, such a hidden inspection unit, which cannot be accessed by the computing units, can also be used to additionally realize the attack detection unit of the IDS in that location. Such an inspection unit can particularly check a shadow memory for inadmissible states and/or malfunctions of the computing unit and/or the virtual computing component and, as a further component of the single-chip system, can itself supply input signals to the attack detection unit.

In some embodiments, the attack detection component comprises at least one of the computing units, in particular a computing unit of the highest security level, with a corresponding software means, so that, for example, a computing unit can be realized exclusively for the IDS or its attack detection component. In this case, computing power is supposed to be diverted but, if possible, without access by the other computing units resulting in a power reduction of the single-chip system. However, depending on the overall structure of the single-chip system, it may open attack paths. Therefore, a computing unit of the highest security level, and consequently a computing unit (and/or also a virtual computing component) that meets the highest security requirements is preferably selected because in the event of an attack, the computing unit (or computing component) that meets the highest security requirements will be compromised last. In some cases, it is also conceivable that a plurality of attack detection components is realized by using a plurality of, in particular all, computing units with appropriate software means. This is based on the consideration that not all computing units are usually compromised at the same time, so that detection of the attack is still possible in any case. By way of a non-limiting example, it also applies analogously that a plurality of, in particular all, virtual computing components of the single-chip system can be used. It must generally be noted that such virtual computing components can be implemented or defined, for example, by a so-called hypervisor. However, in many single-chip systems, in which also security-critical applications are supposed to meet a security requirement according to a security standard, it is usually not possible to obtain certified hypervisor units, so that a further system separation frequently exists.

In some embodiments, the set of attack detection rules, which is stored in, or can be accessed by, the attack detection unit, can also be understood as an "IDS policy." Depending on the extent to which the input signals have already been pre-evaluated by the transmitting components of the single-chip system, by way of a non-limiting example, the set of attack detection rules can only contain rules for logging events, and, therefore, for filtering information, and/or for selecting measures; however, it is also conceivable that the set of attack detection rules can provide a basis for classifying an event as an attack, and thus, for example, in addition to otherwise stored access tables, can describe permitted and not permitted events or assign them to these attack classes.

In some embodiments, the attack detection unit may receive input signals from all important or critical components of the single-chip system, in particular from all coordination components. Still, the monitoring of the input/output operation by receiving signals of the input/output control unit has proven to be pivotal because attacks must take place from the outside into the single-chip system. Still, in essentially all cases, the attacks affect a communication toward the outside of the single-chip system so that the input/output (I/O) is an essential point to be monitored and is in any case tapped by the configuration according to the invention.

In some embodiments, to query or receive input signals from a plurality of components of the single-chip system and to analyze them using the set of attack detection rules, a further hardware signal connection of the attack detection unit to at least one further component of the single-chip system may be provided, wherein the input signals received by the said component are also evaluated for a rule infringement in a set of attack detection rules, which rule infringement needs to be logged and/or responded to with at least one measure. In other words, input signals are received via specific additional hardware signal connections from components of the single-chip system transmitting all relevant information about attacks.

In some embodiments, at least one further component provided is a memory access control unit and/or the memory unit. Memory-related components represent a further, extremely important point, at which attacks/an intrusion can be determined because, in order to manipulate the function of applications executed on computing units or virtual computing components, the memory access may be manipulated, wherein, for example, unallocated memory areas can be accessed. In such a case, it is particularly advantageous if the memory access control unit includes a memory access register and/or the input signals received from the memory unit describe accesses to guard pages of the memory unit that are defined particularly on a physical level. Memory access registers define which computing unit/virtual computing component can or is supposed to or wants to access which memory areas. Such memory access registers are also called "MAR." Corresponding memory access control units, which have a memory access register or MAR, are particularly suitable as a source for identifying harmful intentions on the basis of access to non-permitted memory areas. Guard pages are basically already known in the prior art and preferably represent memory areas which are defined on a physical level and which cannot be accessed by any of the computing units/virtual computing components, and which usually separate memory areas allocated to computing units and/or virtual computing components from one another, for example, in order to cause attacks directed at an overflow to fail because an attempt to access a guard page usually results in a functional termination. Within the scope of the present disclosure, it is now proposed to generate a hardware interrupt on the part of the memory unit as an input signal for the attack detection unit when an attempt is made to access, i.e., to write on or read, a guard page. Such signals thus indicate a non-permissible access to memories. For this purpose, it is particularly preferred if input signals are received via hardware signal connections from both the memory unit and from the memory access control unit because this creates a two-layer security system, wherein input signals from the memory access control unit indicate harmful intentions, and input signals from the guard pages indicate a harmful successful access. In such case, the corresponding responses to the different detections can of course be different.

In some embodiments, the set of attack detection rules can contain further restrictions with regard to the memory unit than, for example, a memory access register or a memory access control unit in general. In addition to access restrictions defined in the set of attack detection rules, types of access can also be analyzed, for example, size restrictions of data objects to be written or read, content restrictions, and the like. It must be pointed out that similar attack detection criteria of the set of attack detection rules can, in addition to the memory unit and/or the memory access control unit, naturally also be used for further components, in particular also with regard to the input/output control unit.

In some embodiments, it can be provided that the input signals received by the memory access control unit describe a load on a memory bus connecting the computing units and the memory unit. A corresponding property describing the load of a memory bus can be obtained from memory access control units with a memory access register (MAR). If, for example, a computing unit or a virtual computing component is present, on which an application is executed, in which the exact timing or the fastest possible response is critical, for example, a security application in a motor vehicle, it usually also requires access to the memory unit, i.e., the MAR. It is required that access to the corresponding memory areas of the memory unit is always available. A harmful attack application on one or more other computing units or virtual computing components can attempt to prevent the time-critical application from accessing the memory areas by DoS attacks ("denial of service"), spoofing, and the like, wherein the memory bus is flooded with queries, for example.

In some embodiments, the memory access control unit and/or the attack detection unit can be designed such that such attacks can be detected. In the case of a detection, various measures can be carried out in the sense of an "intrusion prevention," for example, a reset of the computing units/virtual computing components executing the attack application and/or a reduction in the clock speed as a less drastic response. The measures described here by way of example are implemented within the framework of the single-chip system outside the memory access control unit (MAR unit) with the IDS, or herein particularly with the IPS (intrusion prevention system), realized by the attack detection unit.

In some embodiments, in the case of a partial implementation of the attack detection by generating corresponding input signals for the attack detection unit within the memory access control unit, a configuration is preferably selected, in which the corresponding signal generation for the input signals for the attack detection unit to be provided to the hardware signal connection are hardware-coded and determined in an unchangeable manner, which significantly increases security. However, it is preferred to largely enable the implementation by means of the attack detection unit and the set of attack detection rules stored therein because then, as will be discussed in more detail below, particularly an implementation can also take place in this manner due to the clear separation of the IDS from the computing units/virtual computing components such that dynamic changes are possible, for example, a change in the set of attack detection rules.

In some embodiments, at least one of the at least one further component is an inspection unit provided for monitoring a shadow memory. If the attack detection unit, as already described above, is integrated into such an inspection unit, a further inspection unit can also still communicate with the attack detection unit via a hardware signal connection. Inspection units of this type, as already explained, are used to detect malfunctions of a particularly security-critical application by monitoring the shadow memory. For example, via a shadow memory manager (SMM) which is connected to a security operating system on at least one computing unit or virtual computing component designed to fulfill a security requirement, shadow-memory memory images are generated which are accessed by the inspection unit which is entirely independent from said computing unit/virtual computing component. This makes it possible to check the shadow memory and thus the actions in the security operating system of the at least one computing unit or virtual computing component and to determine inconsistencies which can result in corresponding input signals to the attack detection unit. It is particularly advantageous to couple the IDS to such inspection units because they represent important sources of information about attacks.

In some embodiments, at least one of the at least one further component can furthermore be a computing unit clock (CPU clock) and/or a power management unit and/or an interrupt controller, wherein the input signals coming from said components can be evaluated with regard to a utilization of the single-chip system. In this manner, it is also possible to detect DoS attacks if, for example, a particularly large number of computing operations/queries from at least one of the computing units/at least one virtual computing component occur. By observing the CPU clock, it can also be determined whether a so-called "tuning," for example, an increase in the clock speed, is supposed to take place due to an attack. A power management unit can be used to check how many calls originate from the different computing units/virtual computing components; an interrupt controller provides information on how many interrupts are present, which is particularly relevant for the DoS attacks mentioned.

In some embodiments, at least one of the at least one further component is a configuration register for at least some of the computing units, the input signals of which are checked for configurations which are impermissible in accordance with the set of attack detection rules. For example, specific configurations of computing units/virtual computing components can be marked as not permitted and be detected accordingly. If the single-chip system also has a runtime checker, it can also be a useful further component. In this case, runtime checkers examine memory contents, for example, form checksums/hash values and carry out status comparisons, from which suitable input signals for the attack detection unit can also be derived. In single-chip systems, such runtime checkers are often implemented as hardware and also represent reliable sources.

In some embodiments, at least one of the at least one component can preferably be or comprise a debug interface of the single-chip system. Single-chip systems frequently have debug interfaces, by means of which access and control power can ultimately be obtained over a multiplicity, particularly all, of the components of the single-chip system. While it may well be provided that such debug interfaces are deactivated after completion of the single-chip system, and thus during a later use, they can possibly also be restored by a hardware intervention by an attacker. In such cases or when the debug interface is not deactivated, it represents a gateway for attacks, which is monitored by the IDS, herein specifically by the attack detection unit.

In the case of single-chip systems which also have a so-called guarantee bit, input signals can moreover also be received from a component comprising the guarantee bit via a hardware signal connection because attack events can also result in the guarantee bit being "switched." However, this is usually a one-time occurring, irreversible process that can also be triggered by non-attack processes, so that input signals of a component comprising a guarantee bit are preferably evaluated jointly with other input signals in order to classify at least one event as an attack.

In some embodiments, at least one of the at least one component connected to the attack detection unit by means of a hardware signal connection can be designed to pre-evaluate and/or filter the input signals to be transmitted to the attack detection unit. This means that part of the intelligence of the IDS can already be realized within the component supplying the input signals, for example, by only forwarding to the attack detection unit specific signals that have already been pre-filtered and/or are the result of a pre-evaluation. These component-side portions of the signal processing are preferably determined in hardware in an unalterably encoded manner, for which corresponding methods are already known in the prior art, in order to avoid a manipulative attack at this point. As a result, the authenticity of the input signals forwarded to the attack detection unit can be ensured, at least as long as no hardware attack takes place.

In some embodiments, in order to increase security, the set of attack detection rules, hence the IDS policy mentioned, is unalterably determined as hardware or, in a secured method, is alterable, particularly using secret information which is unalterably encoded as hardware in the single-chip system. For such purpose, it is preferred to allow a changeability in a secured method since the attack detection unit, as has been described, is in any case designed such that computing units/virtual computing components or other possibly manipulating components cannot exercise any manipulative access to the attack detection unit. By storing secret, in particular also shared, information and a preferably separate configuration connection for the attack detection unit, it is possible to update or generally adapt the set of attack detection rules in a secure method, for example, by using keys as secret information. For this purpose, the secret information can be encoded as part of or specifically connected to the attack detection unit, wherein, however, it is also conceivable to use a determined and unalterable secret information already provided in the single-chip system. By way of a non-limiting example, a one-time determination of the set of attack detection rules can also be provided, for example, during the production of the single-chip system and/or through a one-time programmability at a later point in time, for example, during the manufacture of an overall device, in particular a motor vehicle that is supposed to contain the single-chip system. For example, the single-chip system can be sealed using techniques such as "fusing" or the like, once the set of attack detection rules is determined.

In some embodiments, for logging, different approaches are possible which can also be used in combination. For example, it can be provided that the attack detection unit is designed, particularly on the basis of the set of attack detection rules, to log an event classified as an attack in an internal and/or an external memory device and/or to forward the event classified as an attack to a computing device external to the single-chip system. Therefore, an internal logging in an internal memory device is conceivable, which, for example, can be read out at a later time in order to be able to analyze attacks that have possibly taken place and to determine data for improving the single-chip system or the software means used therein. However, it is also conceivable and preferred according to the present disclosure that an external logging is carried out by means of an external memory device and/or an external computing device. In this context, it is in principle conceivable, but less preferred, to provide a separate input/output unit for the attack detection unit, since such specifically provided input/output units have to be realized in a space-consuming manner and increase the complexity of the single-chip system. According to the present disclosure, it is therefore preferred to use at least one of the at least one input/output unit which can also be utilized by the computing unit. For this purpose, for example, hardware output lines from the attack detection unit to the computing units and/or the input/output unit and/or the input/output control unit can be realized, which are preferably unidirectional in order to prevent access to the attack detection unit via said hardware output lines. Communication via an input/output unit to an external memory device/computing unit can take place, for example, via at least one of the computing units, wherein the safest computing units/computing unit are/is preferably used when the number of computing units is small or one. In other words, for forwarding to the outside, a processing unit is addressed which is likely to be taken over at a later stage, if at all, in the event of an encroachment. It can also be expedient to forward the corresponding output signals for forwarding/logging an event classified as an attack to all computing units of the single-chip system, since it is unlikely that all of these computing units have already been compromised, so that the forwarding of the output signal via the input/output unit can essentially be ensured.

In some embodiments, for a forwarding to the external computing device and/or the external memory device, a chip ID identifier that can be read out from a chip ID answerback unit is expediently added to the event data describing the event classified as an attack, i.e., particularly to the output signal. In this manner, it can also be determined in the external memory device/external computing device, to which single-chip system the event data relate.

In some embodiments, the attack detection unit, when evaluating the input signals, is designed to determine event data describing a cause of an event classified as an attack and/or describing the type of event, wherein particularly also event data describing the time of the event are determined. With regard to logged events to be evaluated and/or the adoption of measures, it is therefore expedient to know in the case of an event, which component of the single-chip system has performed what kind of activity that has been classified at least as a potential attack. If a time stamp is already available, for example, in the input signals, it seems prudent to also add said time stamp to the event data. For this purpose, it is expedient to not provide the attack detection unit itself with a timer because it would have to be synchronized with the remaining timers of the single-chip system, which could represent a possible point of attack into the attack detection unit.

In some embodiments, if security-critical applications have to be executed by at least some of the computing units, security requirements for components or parts of components of the single-chip system can thus be provided, for example, in a motor vehicle, in which the single-chip system is supposed to realize security functions and/or automatic vehicle guidance functions. Such security requirements usually manifest themselves by compliance with a standard, wherein, in the example of motor vehicles as an overall device, in which a single-chip system according to the present disclosure is used particularly in a control device, such a standard as the ISO 26262 standard exists, which determines different security requirements as so-called automotive safety integrity level (ASIL) classes. If a part of the components of the single-chip system is designed to meet a security requirement, said security requirement may be transmitted, at least partially, to the IDS, i.e., particularly to the attack detection unit, especially in the event that measures are also supposed to be taken in response to events classified as an attack. However, due to the effort required to meet the security requirement, it is less preferred in this context to design the entire attack detection unit, and thus also the portions that relate to non-security-critical applications/functions, in accordance with the (highest) security requirement. If a security requirement is present, it is thus conceivable that an attack detection unit that meets the security requirement is provided for at least some of the components of the single-chip system.

In some embodiments, at least two attack detection units are used, wherein at least one of them meets the security requirement of the attack detection unit that carries out the portion of the evaluation of the input signals which concern the security requirement. An attack detection unit of an IDS, in particular an IDPS, which evaluates input signals, can thus be "disassembled" in order to implement only the portions that actually relate to the security requirement in a more elaborate form and also meet the security requirement. For example, a certified implementation of the attack detection unit that fulfills the security requirement can take place.

As already mentioned, the need to meet the security requirements is particularly given when a response, and therefore a measure, is provided for the part of the single-chip system that fulfills the security requirement, for example, the termination and/or modification of a compromised application. After corresponding parts of the IDS have also been realized to meet the security requirement, the execution of the measures also results in the security requirement being met overall, without too much effort having to be made with regard to other parts of the IDS.

As already mentioned, in addition to the realization of an IDS (intrusion detection system), the execution of protective measures as measures for at least some of the events classified as attacks also results in the realization of an IPS (intrusion prevention system), i.e., combined in an IDPS (intrusion detection and prevention system). In this case, it can therefore be said that the attack detection unit is additionally designed as an attack prevention unit triggering at least one protective measure for at least part of the events classified as an attack.

In some embodiments, the measure signals describing the protective measures can be transmitted via hardware measure connections to the components of the single-chip system affected by the measure and/or to all computing units and/or virtual computing components. These hardware measure connections are designed to be unidirectional from the attack detection unit to the corresponding components of the single-chip system in order to prevent the components accessing the attack detection unit. Protective measures can include, for example, a deactivation and/or resetting of computing units and/or further components of the single-chip system and/or a change of operating parameters, for example, clock frequencies and/or access permissions. Termination and restart of specific applications are also conceivable.

In addition to the single-chip system, the present disclosure also relates to a method for operating a single-chip system as described herein, in which input signals received from the attack detection unit for classifying events corresponding to attacks are evaluated using the set of attack detection rules. All descriptions relating to the single-chip system can be applied to the method according to the present disclosure.

Finally, the present disclosure also relates to a motor vehicle, having at least one control device with a single-chip system according to various embodiments as described in the present disclosure. Such a single-chip system can be easily transferred particularly to a motor vehicle, for example, within the framework of the concept of a central advanced driver assistance system, wherein driver assistance functions of different advanced driver assistance systems, for which particularly different security requirements also apply, are to be executed jointly in one control device and thus at least partially in one single-chip system. Especially with regard to safety-critical applications that can realize driver assistance functions within a motor vehicle, it is extremely expedient to realize an IDS or particularly an IDPS. Another variation applicable to the present disclosure are infotainment systems with portions that are supposed to meet a security requirement, for example, an ASIL standard. Such portions relate, for example, to information originating from a control device that is supposed to meet a security requirement, and which are supposed to be displayed. All descriptions regarding the single-chip system can be transferred analogously to the motor vehicle according to the present disclosure.

Further advantages and details of the present disclosure shall become apparent from the embodiments described below and by means of the drawings.

Figure 1:
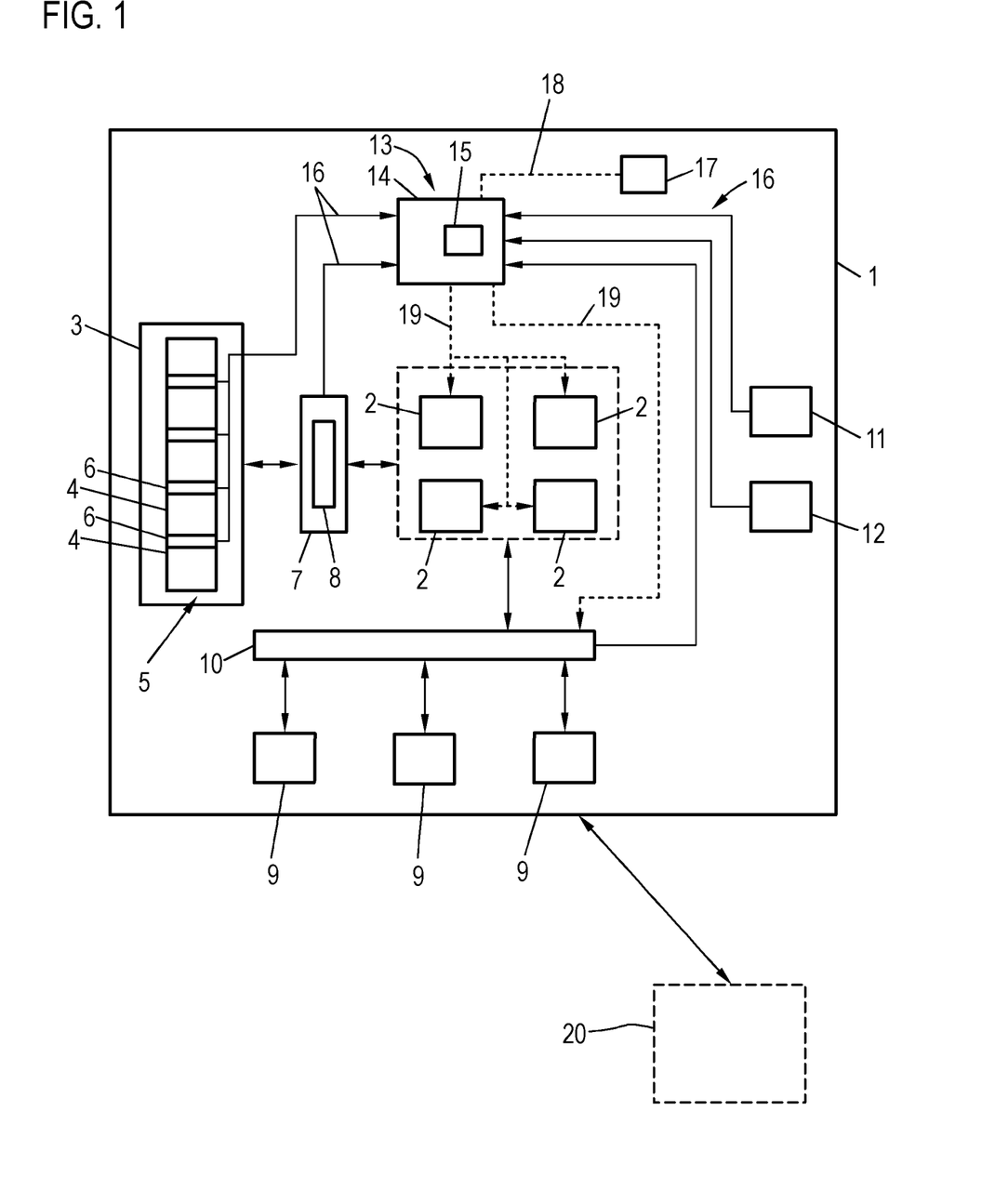
FIG. 1 illustrates a schematic diagram of a single-chip system in accordance with some embodiments.

FIG. 1 shows a schematic diagram of a single-chip system 1 according to the present disclosure (system on chip or SoC). In the present case, the single-chip system 1 has, by way of example, four computing units 2 designed as computer cores, in which different operating systems and/or applications can be executed, wherein it is possible for a plurality of computing units 2 to be assigned to one operating system/one application, and/or a partial allocation is also possible, i.e., virtual computing components can be defined, for example, by a hypervisor.

In accordance with some embodiments, in order to provide RAM for the computing units 2, the single-chip system 1 further comprises a memory unit 3 which has a memory space 5 divided into memory areas 4 for the computing units 2, wherein the memory areas 4 are each separated by guard pages 6. The access of the computing units 2 to the memory unit 3 is coordinated by a memory access control unit 7 which can comprise a corresponding access register 8 (memory access register or MAR). The single-chip system 1 comprises a plurality of input/output units 9 which can establish connections to the outside world and can comprise, for example, a PCI Express interface and/or a UART interface and/or an I2C interface and/or an SPI interface and/or other interfaces and the associated drivers.

A coordination is also provided with regard to the input/output (I/O), in accordance with some embodiments, via an input/output control unit 10, in which an access register can also be present. Further components of the single-chip system comprise a debug interface 11, an interrupt controller 12 and, as further components, not depicted for the sake of clarity, a computing unit timer (CPU clock), a power management unit, a configuration register for at least some of the computing units 2, a guarantee bit, and a chip ID answerback unit.

Integrated in terms of hardware, the single-chip system 1 has an attack detection system or IDS 13, which particularly has an attack detection unit 14 implemented as separate hardware in the present embodiment, in which a set of attack detection rules 15 is stored, with which events described by input signals can be classified as an attack, or not, wherein a precise classification of different attacks or their criticality is naturally also possible. The attack detection unit 14 receives the input signals from different components of the single-chip system via hardware signal connections 16 that are unidirectional. In the present case, the attack detection unit 14 receives input signals via hardware signal connections 16 at least from the memory unit 3, the memory access control unit 7, the input/output control unit 10, the debug interface 11, and the interrupt controller 12. Further sources for input signals can be the computing unit timer, the power management unit, the configuration register, a runtime checker realized as hardware, and/or the guarantee bit.

The input signals can be generated directly as hardware interrupts and the like and forwarded to the attack detection unit 14 in an unfiltered/unevaluated manner, in order to provide as few attack options as possible. However, configurations, in which a pre-evaluation and/or filtering is performed by one of the components supplying the input signals, are also conceivable. As a result, the data load for the attack detection unit 14 is reduced, and it can thus be realized in a smaller size/in a less complex manner.

The set of attack detection rules can be stored, unalterably encoded in hardware, i.e., as a one-time determination, in the attack detection unit 14, wherein a basically alterable configuration is also conceivable, in which case secret information, for example, a key, stored unalterably in the single-chip system 1, is used to carry out an authentication in the case of a change.

The set of attack detection rules 15 can determine classifications, for example, when and how critically an attack is present, by describing what rights particularly the computing units 2, and/or the virtual computing components formed by said computing units 2, have. The set of attack detection rules 15 can further describe how to deal with detected attacks, i.e., what is supposed to happen when at least one event is classified as an attack. The measures range from different logging actions to possibly provided protective measures, wherein, in the latter case, the attack detection unit 14 is also designed as an attack prevention unit, resulting overall in an IDPS 13 (intrusion detection and prevention system). Logging can subsequently take place by means of an internal memory device 17, to which a corresponding hardware output line 18 is guided. However, it is also conceivable to communicate event data describing an event as a communicated attack toward the outside of the single-chip system 1, for which purpose a separate input/output unit can additionally be provided for the attack detection unit 14 as a less preferred embodiment; however, with regard to the implementation, this is elaborate, especially if a fast connection, particularly an Ethernet connection, is to be used due to the time criticality that may exist.

In accordance with some embodiments, to use at least one of the input/output units 9, for which a corresponding output signal (measure signal or logging signal) can be transmitted via unidirectionally realized hardware measure connections 19 to all the computing units 2 because it is less likely that all the computing units 2 are compromised at the same time, and/or it can be transmitted to the input/output control unit 10. It is thus possible to forward the event data to an external memory device and/or computing device 20 for logging and/or for further processing, particularly also with regard to protective measures. The event data, which describe a cause of an event classified as an attack, the type of event, and a time of the event, are supplemented by a chip ID answerback unit that can be read out in the chip ID identifier, so that the external memory device and/or the computing device 20 can make a corresponding allocation.

With regard to the evaluation of the memory activities of the computing units 2, the attack detection unit 14 can receive, for example, general access information from the memory access control unit 7, which can be verified against permitted access queries according to the set of attack detection rules 15. Particularly, accesses to the guard pages 6 are also monitored by hardware interrupts, so that ultimately a double security check takes place.

If the attack detection unit 14 is also designed as an attack prevention unit, protective measures are therefore provided which can also be forwarded via the hardware measure lines 19 to corresponding components, particularly the computing units 2, which are supposed to execute the protective measures. For example, internal timers of the computing units 2 can be reset if a DoS attack is suspected, and/or computing units and/or virtual computing components can be reset and/or deactivated. Depending on the detected attack, a wide variety of protective measures are therefore conceivable.

Figure 2:
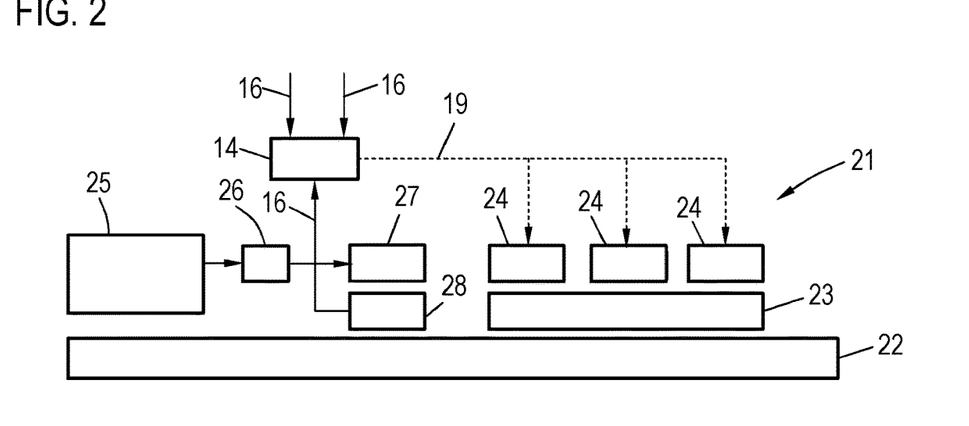
FIG. 2 illustrates an abstracted depiction of an architecture of a single-chip system in accordance with some embodiments.

FIG. 2 structurally explains a second embodiment of a single-chip system according to the present disclosure using a depicted section 21. In this embodiment, the attack detection unit 14, once again realized as its own hardware, also receives input signals via hardware signal connections 16 from the components of the single-chip system 1 mentioned in relation to the first embodiment.

In accordance with some embodiments, proceeding from the physical components (indicated by 22), three virtual computing components 24 are defined by a hypervisor 23 using one or more computing units 2 by way of example, wherein, in the present case, said virtual computing components 24 perform operating systems and applications which meet low security requirements. Since the hypervisor 23 is not certified with regard to a security standard, a further virtual computing component 25 is formed using other computing units 2 in order to perform a security-critical application that meets a higher security requirement, for example, a security function and/or vehicle guidance function in a motor vehicle. During operation of the virtual computing component 25, a shadow memory 27 is described via a shadow memory manager 26, to which a shadow memory inspection unit 28 is assigned, and which monitors and checks the contents of the shadow memory 27, realized as its own hardware, particularly as its own additional computing unit, in order to be able to determine errors, access violations and the like, thus detecting attacks by itself or at least creating the basis for an attack detection. The inspection unit 28 is also connected to the attack detection unit 14 via a hardware signal connection 16 in order to forward corresponding input signals which indicate a successful attack and/or which can be evaluated for the detection of such an attack.

It must be pointed out that in the embodiment according to FIG. 2, hardware measure connections 19 are not guided to the computing units 2 of the virtual computing component 25 because in the present case, the inspection unit 28 and the attack detection unit 14 are not designed to be certified for the security requirement of the virtual computing component 25. This would change if the inspection unit 28 and the attack detection unit 14 were to meet the security requirement, and were thus certified, which is basically conceivable within the scope of the present disclosure; similarly, it would basically also be possible to integrate the hardware of the inspection unit 28 and the attack detection unit 14, for example, to utilize a common and additional computing unit.

Figure 3:
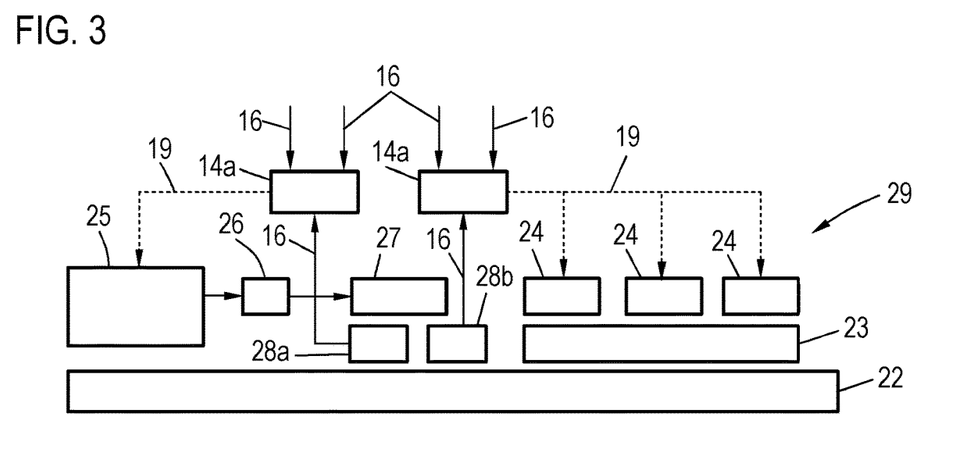
FIG. 3 illustrates a schematic depiction of the architecture of a single-chip system in accordance with some embodiments.

However, with regard to the security requirements, an improved configuration is possible with less expenditure, as shown in FIG. 3 in a section 29, which corresponds to section 21, of a third embodiment of a single-chip system 1 according to the disclosure. As can be seen, both the inspection unit 28 and the attack detection unit 14 are divided into portions which meet the security standard and those which do not have to meet the security standard, so that inspection units 28*a* and 28*b* and attack detection units 14*a* and 14*b* are present. The inspection unit 28*a* is connected to the inspection unit 14*a* via a hardware signal connection 16, wherein both meet the security standard. The inspection unit 28*b* is connected to the attack detection unit 14*b* via a hardware signal line 16, wherein both do not meet the security requirements and can thus be realized in a simpler and less complex manner. In other words, the security-relevant portions of the IDS 13 or the IDPS are separated, which, particularly due to the now certified attack detection unit 14*a*, also allows preventive measures to be taken on the virtual computing component 25 via a hardware measure connection 19. It must be noted that a plurality of virtual computing components 25, which can meet the same or different security requirements, can naturally also be present.

Figure 4:
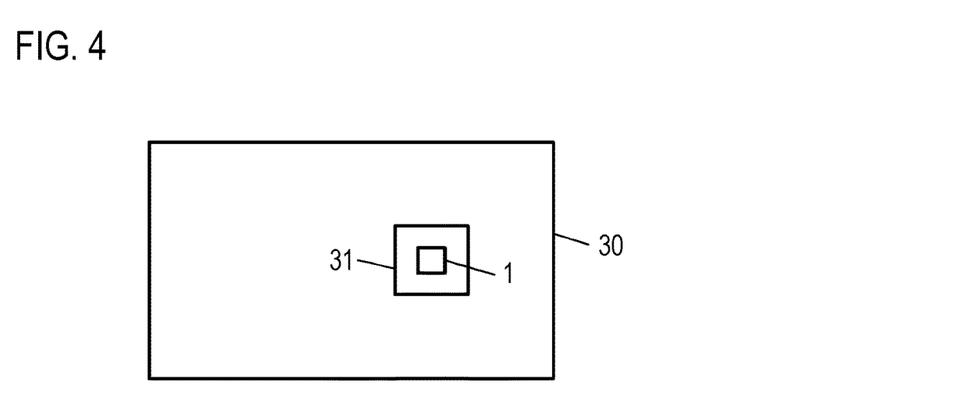
FIG. 4 illustrates a schematic diagram of a motor vehicle in accordance with some embodiments.

FIG. 4 finally shows a schematic diagram of a motor vehicle 30 according to the present disclosure, having at least one control device 31 which comprises a single-chip system 1 according to the present disclosure. It has been shown that the technology described herein can be used particularly for motor vehicles, in which different security requirements/security standards can frequently also be present within a control device 31.

The invention claimed is:

1. A single-chip system, comprising:
   a plurality of computing units;
   at least one input/output unit;
   a memory unit;
   an input/output control unit configured to coordinate communication between the plurality of computing units and the at least one input/output unit; and
   an attack detection unit communicatively connected to the input/output control unit via a first hardware signal connection, wherein the attack detection unit is configured to:
   evaluate a first input signal received from the input/output control unit for determining infringement of one or more rules based on a set of attack detection rules, wherein the attack detection rules comprise restrictions to the memory unit;
   based on the evaluation of the first input signal and upon determination of a first infringement of the one or more rules, log the first infringement of the one or more rules;
   based on the evaluation of the first input signal and upon determination of infringement of the one or more rules, respond to the first infringement of the one or more rules with at least one preconfigured measure;
   evaluate a second input signal received from at least one component of the single-chip system via a second hardware signal connection for determining a second infringement of the one or more rules based on the set of attack detection rules;
   based on the evaluation of the second input signal and upon determination of infringement of the one or more rules, log the second infringement of the one or more rules; and
   based on the evaluation of the second input signal and upon determination of infringement of the one or more rules, respond to the second infringement of the one or more rules with the at least one preconfigured measure,
   wherein the at least one component of the single-chip system comprises a memory access control unit and/or the memory unit.

2. The single-chip system of claim 1, wherein the plurality of computing units comprise one or more computer cores and/or one or more central processing units,
   wherein the memory access control unit comprises a memory access register, and
   wherein the memory unit is configured to receive an input signal to access a guard page of the memory unit, wherein the guard page is described on a physical level.

3. The single-chip system of claim 1, wherein the attack detection unit is either a separate hardware component of the single-chip system or a part of an inspection unit for monitoring the plurality of computing units or a virtual computing component of the single-chip system, and
wherein the inspection unit is configured to analyze a shadow memory of the single-chip system.

4. The single-chip system of claim 1, wherein the second input signal corresponds to a load on a memory bus connecting the plurality of computing units and the memory unit.

5. The single-chip system of claim 1, wherein the at least one component of the single-chip system further comprises an inspection unit configured for monitoring a shadow memory of the single-chip system.

6. The single-chip system of claim 1, wherein the at least one component of the single-chip system further comprises a computing unit timer, a power management unit, a configuration register associated with the plurality of computing units, and/or an interrupt controller, and
wherein the attack detection unit is further configured to:
evaluate the second input signal from the at least one component of the single-chip system for determining utilization of the single-chip system or impermissible configuration based on the set of attack detection rules.

7. The single-chip system of claim 1, wherein the at least one component of the single-chip system further comprises a debug interface of the single-chip system.

8. The single-chip system of claim 1, wherein the attack detection unit is further configured to:
pre-evaluate the first input signal or the second input signal transmitted to the attack detection unit for filtering the first input signal or the second input signal.

9. The single-chip system of claim 1, wherein the set of attack detection rules is either unalterable in hardware or alterable using a secured method according to secret information encoded in the hardware in the single-chip system.

10. The single-chip system of claim 1, wherein the attack detection unit is further configured to:
forward an event classified as an attack on an internal memory device or an external memory device to a computing device external to the single-chip system.

11. The single-chip system of claim 10, wherein the attack detection unit is further configured to:
add a chip ID identifier to event data corresponding to the event classified as the attack on the internal memory device or the external memory device.

12. The single-chip system of claim 1, wherein the attack detection unit is further configured to:
determine event data corresponding to a cause of an event classified as an attack, a type of the event, and/or time of the event.

13. The single-chip system of claim 1, wherein the attack detection unit meets security requirements corresponding to the at least one component of the single-chip system for evaluating the first input signal or the second input signal related to the security requirements.

14. The single-chip system of claim 1, wherein the attack detection unit is further configured to:
trigger the at least one preconfigured measure for at least part of an event classified as an attack; and
transmit one or more signals describing the at least one preconfigured measure via hardware measure connections to the at least one component of the single-chip system affected by the at least one preconfigured measure, the plurality of computing units, and/or a virtual computing component.

15. A method for operating a single-chip system, the method comprising:
evaluating a first input signal received from an input/output control unit via a first hardware signal connection for determining a first infringement of one or more rules based on a set of attack detection rules;
based on the evaluation of the first input signal and upon determination of the first infringement of the one or more rules, logging the first infringement of the one or more rules;
based on the evaluation of the first input signal and upon determination of the first infringement of the one or more rules, responding to the first infringement of the one or more rules with at least one preconfigured measure;
evaluating a second input signal received from at least one component of the single-chip system via a second hardware signal connection for determining a second infringement of the one or more rules based on the set of attack detection rules, wherein the attack detection rules comprise restrictions to the memory unit;
based on the evaluation of the second input signal and upon determination of the second infringement of the one or more rules, logging the second infringement of the one or more rules; and
based on the evaluation of the second input signal and upon determination of the second infringement of the one or more rules, responding to the second infringement of the one or more rules with the at least one preconfigured measure,
wherein the at least one component of the single-chip system comprises a memory access control unit and/or a memory unit.

16. A motor vehicle, comprising:
a control device that comprises a single-chip system,
wherein the single-chip system comprises:
a plurality of computing units,
at least one input/output unit,
a memory unit,
an input/output control unit configured to coordinate communication between the plurality of computing units and the at least one input/output unit,
an attack detection unit communicatively connected to the input/output control unit via a first hardware signal connection,
wherein the attack detection unit is configured to:
evaluate a first input signal received from the input/output control unit for determining infringement of one or more rules based on a set of attack detection rules, wherein the attack detection rules comprise restrictions to the memory unit,
based on the evaluation of the first input signal and upon determination of a first infringement of the one or more rules, log the first infringement of the one or more rules,
based on the evaluation of the first input signal and upon determination of infringement of the one or more rules, respond to the first infringement of the one or more rules with at least one preconfigured measure,
evaluate a second input signal received from at least one component of the single-chip system via a second hardware signal connection for determining a second infringement of the one or more rules based on the set of attack detection rules, based on the evaluation of the second input signal and upon determination of infringement of the one or more rules, log the second infringement of the one or more rules, and based on the evaluation of the second input signal and upon determination of infringement of the one or more rules, respond to the second infringement of the one or more rules with the at least one preconfigured measure, wherein the at least one component of the single-chip system comprises a memory access control unit and/or the memory unit.

\* \* \* \* \*